(12) United States Patent
Long

(10) Patent No.: US 7,913,885 B2
(45) Date of Patent: Mar. 29, 2011

(54) STOWABLE APPARATUS FOR SECURING AN EXTENSION LADDER TO A PICKUP TRUCK

(76) Inventor: Jason Ron Long, Pleasant Grove, UT (US)

( * ) Notice: Subject to any disclaimer, the term of this patent is extended or adjusted under 35 U.S.C. 154(b) by 1600 days.

(21) Appl. No.: 11/220,135

(22) Filed: Sep. 6, 2005

(65) Prior Publication Data

US 2007/0062991 A1    Mar. 22, 2007

(51) Int. Cl.
  *B60R 7/00*  (2006.01)
  *B60R 9/00*  (2006.01)
  *B60R 11/00*  (2006.01)
  *B60R 9/048*  (2006.01)
  *E06C 5/00*  (2006.01)

(52) U.S. Cl. ........ 224/403; 224/405; 224/492; 224/309; 224/319; 224/324; 224/545; 224/558; 182/127

(58) Field of Classification Search .................. 224/403, 224/405, 492, 309, 319, 324, 545, 558; 182/127
See application file for complete search history.

(56) References Cited

U.S. PATENT DOCUMENTS

| | | | | |
|---|---|---|---|---|
| 2,080,527 | A * | 5/1937 | Bixel | 248/316.5 |
| 2,237,853 | A * | 4/1941 | Troche | 182/127 |
| 2,586,531 | A * | 2/1952 | Gordon | 182/127 |
| 2,615,667 | A | 10/1952 | Smith et al. | |
| 3,283,972 | A | 11/1966 | Kocina | |
| 4,008,838 | A * | 2/1977 | Correll | 224/315 |
| 4,389,067 | A * | 6/1983 | Rubio | 296/50 |
| 4,751,981 | A * | 6/1988 | Mitchell et al. | 182/127 |
| 4,813,585 | A * | 3/1989 | Nutt | 224/324 |
| 4,923,103 | A * | 5/1990 | Sauber | 224/546 |
| 4,957,400 | A * | 9/1990 | Karp | 410/110 |
| 5,011,349 | A * | 4/1991 | McAndrews | 410/102 |
| 5,139,108 | A * | 8/1992 | Pate | 182/129 |
| 5,242,094 | A * | 9/1993 | Finley | 224/324 |
| 5,518,357 | A | 5/1996 | Ziaylek, Jr. et al. | |
| 5,651,484 | A * | 7/1997 | Fugman | 224/405 |
| 5,662,254 | A * | 9/1997 | Lemajeur et al. | 224/405 |
| 5,779,208 | A * | 7/1998 | McGraw | 248/238 |
| 6,179,543 | B1 * | 1/2001 | Adame et al. | 414/462 |
| 6,315,327 | B1 * | 11/2001 | Woolsey | 280/770 |
| 6,454,149 | B1 * | 9/2002 | Moore | 224/405 |
| 6,896,273 | B2 * | 5/2005 | Forsberg et al. | 280/79.11 |
| 6,935,671 | B2 * | 8/2005 | Bruford et al. | 296/57.1 |
| 7,080,714 | B2 * | 7/2006 | Stout | 182/127 |
| 7,097,409 | B2 * | 8/2006 | Richter | 414/462 |
| 7,104,429 | B1 * | 9/2006 | Flores | 224/405 |
| 2001/0030213 | A1 * | 10/2001 | Anderson | 224/324 |
| 2006/0124394 | A1 * | 6/2006 | Bracken et al. | 182/107 |

* cited by examiner

*Primary Examiner* — Nathan J Newhouse
*Assistant Examiner* — Lester L Vanterpool
(74) *Attorney, Agent, or Firm* — Angus C. Fox, III

(57) ABSTRACT

An apparatus for securing and carrying an extension ladder on a pickup truck is designed so that the ladder rests on both the rear edge of the cab and the upper edge of the tailgate and on the ladder. The apparatus includes resilient pads which are secured to lower edges of the rails with straps to prevent damage to the cab and tailgate. A ladder retention bracket, which mounts on the ladder, has a generally L-shaped frame to which is attached a padded stop plate and at least one ladder indexing arm. The stop plate contacts the inner vertical surface of the tailgate and prevents the secured ladder from sliding rearward, while the ladder indexing arms prevent the ladder from shifting with respect to the ladder retention bracket. With the ladder properly positioned on the vehicle, it is tied or strapped to prevent forward, lateral and vertical movement.

20 Claims, 7 Drawing Sheets

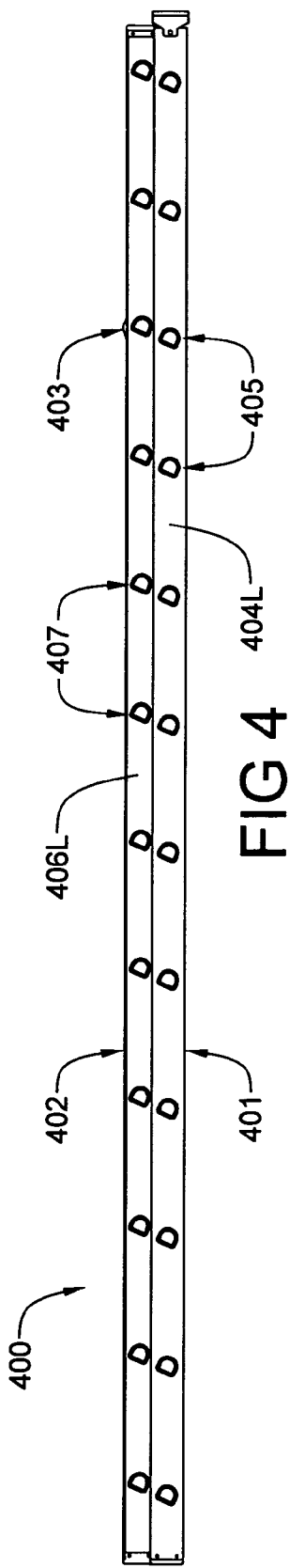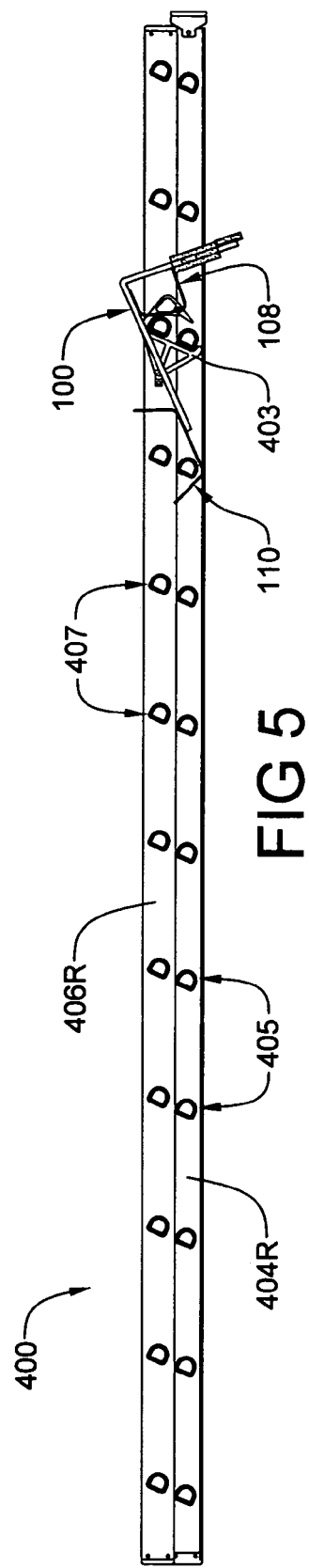

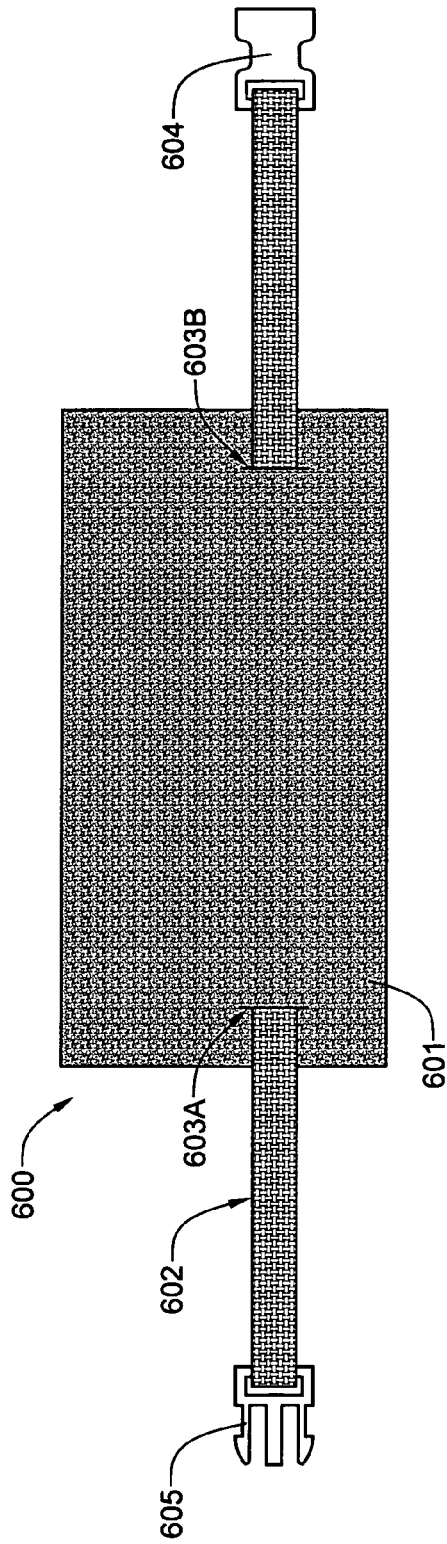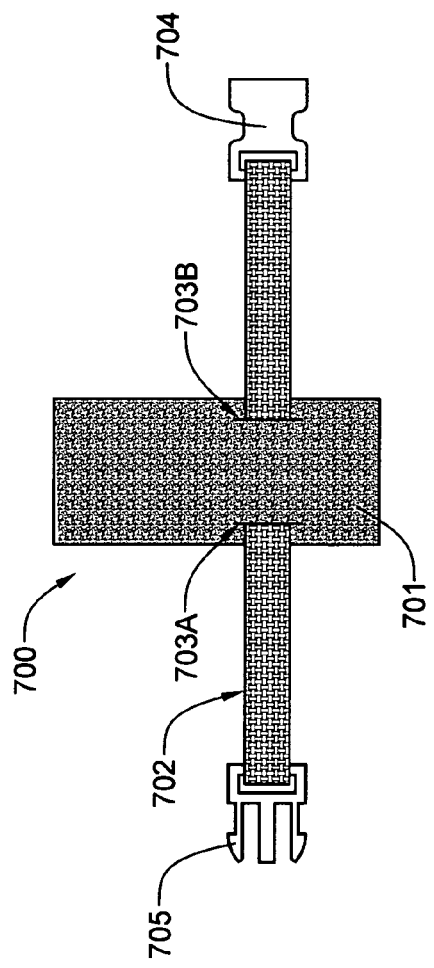

STOWABLE APPARATUS FOR SECURING AN EXTENSION LADDER TO A PICKUP TRUCK

BACKGROUND OF THE INVENTION

1. Field of the Invention

The invention relates generally to apparatus for securing extension ladders on a motor vehicle such as a pickup truck and, more particularly, to apparatus that are not permanently attached to the motor vehicle.

2. History of the Prior Art

During the past century, many different apparatus have been designed for the purpose of securing ladders to motor vehicles. Most of such apparatus are, at least partially, permanently affixed to the motor vehicle. Only a very small number are designed to secure a ladder to the vehicle without any permanent attachment of the apparatus to the vehicle.

U.S. Pat. No. 4,751,981 to John C. Mitchell, et al. is an example of a ladder carrying rack mounted in a detachable manner along one side of the bed of a pickup truck. The rack includes a pair of stanchions, each of which has an upper end provided with an arm for ladder support. Each stanchions mates with and is lockable to a bracket that is preferably bolted to one side of the bed. Multiple posts, each having a retention head, are affixed to each bracket, and engage sockets on a single stanchion. A flexible lock on each stanchion automatically engages a post on the associated bracket to prevent upward displacement of the stanchion during travel of the vehicle.

U.S. Pat. No. 2,615,667 to M. Smith et al. discloses an apparatus mountable on a vehicle, such as a utility truck, to which one or more ladders may be clamped, transported, and rapidly unclamped just before the use thereof. The apparatus is typical of many such apparatus, as it must be semi-permanently installed on the vehicle.

U.S. Pat. No. 2,237,853 to Herman J. Troche discloses a ladder clamping apparatus that includes a pair of U-shaped supports, each of which is mounted on both vertical sides of a truck body. A ladder may be clamped to a central horizontal component of each support that spans the width of the vehicle.

U.S. Pat. No. 4,008,838 to Richard R. Correll discloses a ladder rack mountable on a van-type vehicle. The ladder rack includes a frame which overlies the roof of the vehicle and includes a transverse member which supports a ladder placed on the frame. A hook member is provided which secures the ladder to the frame.

U.S. Pat. No. 3,283,972 to Lawrence A. Kocina discloses an apparatus for carrying a ladder on the roof of an automobile. The apparatus, which does not permanently attach to the vehicle, includes at least four flexible carrier brackets, at least two of which clip to each rail of the ladder. The carrier brackets provides a buffer between the ladder and the roof of the automobile which prevents the ladder from scratching or denting the roof. The ends of the ladder are secured with rope to the four corners of the vehicle, being preferably attached to the ends of the front and rear bumpers. U.S. Pat. No. 3,283,972 (hereinafter the '972 patent) to Kocina is hereby incorporated in this application by reference.

The prior art does not disclose an apparatus that may be used to secure a ladder to a pickup truck without permanently installing at least certain components of the apparatus on the pickup truck.

SUMMARY OF THE INVENTION

The present invention provides an apparatus for securing and carrying an extension ladder on a pickup truck. The apparatus is designed so that the ladder rests on both the rear edge of the cab and the upper edge of the tailgate and on the ladder. Specially designed pads are secured to lower edges of the rails with straps to prevent damage to the cab and tailgate where the ladder rests on them. A ladder retention bracket, which maintains the longitudinal position of the ladder, has a generally L-shaped frame to which is attached a padded stop plate and at least one ladder indexing arm. The stop plate contacts the inner vertical surface of the tailgate and prevents the secured ladder from sliding rearward, while the ladder indexing arms prevent the ladder from shifting with respect to the ladder retention bracket. With the ladder properly positioned on the vehicle, it is tied or strapped to prevent forward, lateral and vertical movement.

BRIEF DESCRIPTION OF THE DRAWINGS

FIG. 4 is a left-side elevational view of an extension ladder;

FIG. 5 is a cross-sectional view of the extension ladder of FIG. 4, with the section plane passing through and perpendicular to the longitudinal axis of all rungs of the ladder just inside the left rail, and also showing the ladder retention bracket of FIG. 1 installed between the rungs of a lower portion thereof;

FIG. 6 is a top plan view of a front support pad strappable to an extension ladder and positionable between the extension ladder and the rear edge of the pickup cab;

FIG. 7 is a top plan view of one of a pair of identical rear support pads, each of which is strappable to a single rail of an extension ladder and positionable between the extension ladder and the upper edge of the pickup tailgate;

DETAILED DISCLOSURE OF THE INVENTION

The present invention provides an apparatus for securing and carrying an extension ladder on a pickup truck without the need to install permanent structures, other than optional tie-down anchors, on the vehicle. The apparatus is designed so that the ladder rests on both the rear edge of the cab and the upper edge of the tailgate and on the ladder. Specially designed pads are secured to lower edges of the rails with straps to prevent damage to the cab and tailgate where the ladder rests on them. A ladder retention bracket, which maintains the longitudinal position of the ladder, has a generally L-shaped frame to which is attached a padded stop plate and at least one ladder indexing arm. The stop plate contacts the inner vertical surface of the tailgate and prevents the secured ladder from sliding rearward, while the ladder indexing arms prevent the ladder from shifting with respect to the ladder retention bracket. With the ladder properly positioned on the vehicle, it is tied or strapped to prevent forward, lateral and vertical movement. It should also be evident that the forward slope of the ladder assists in the prevention of forward movement thereof.

The apparatus for securing and carrying an extension ladder on a pickup truck will now be described in detail, with reference to the attached drawing figures.

Figure 1:
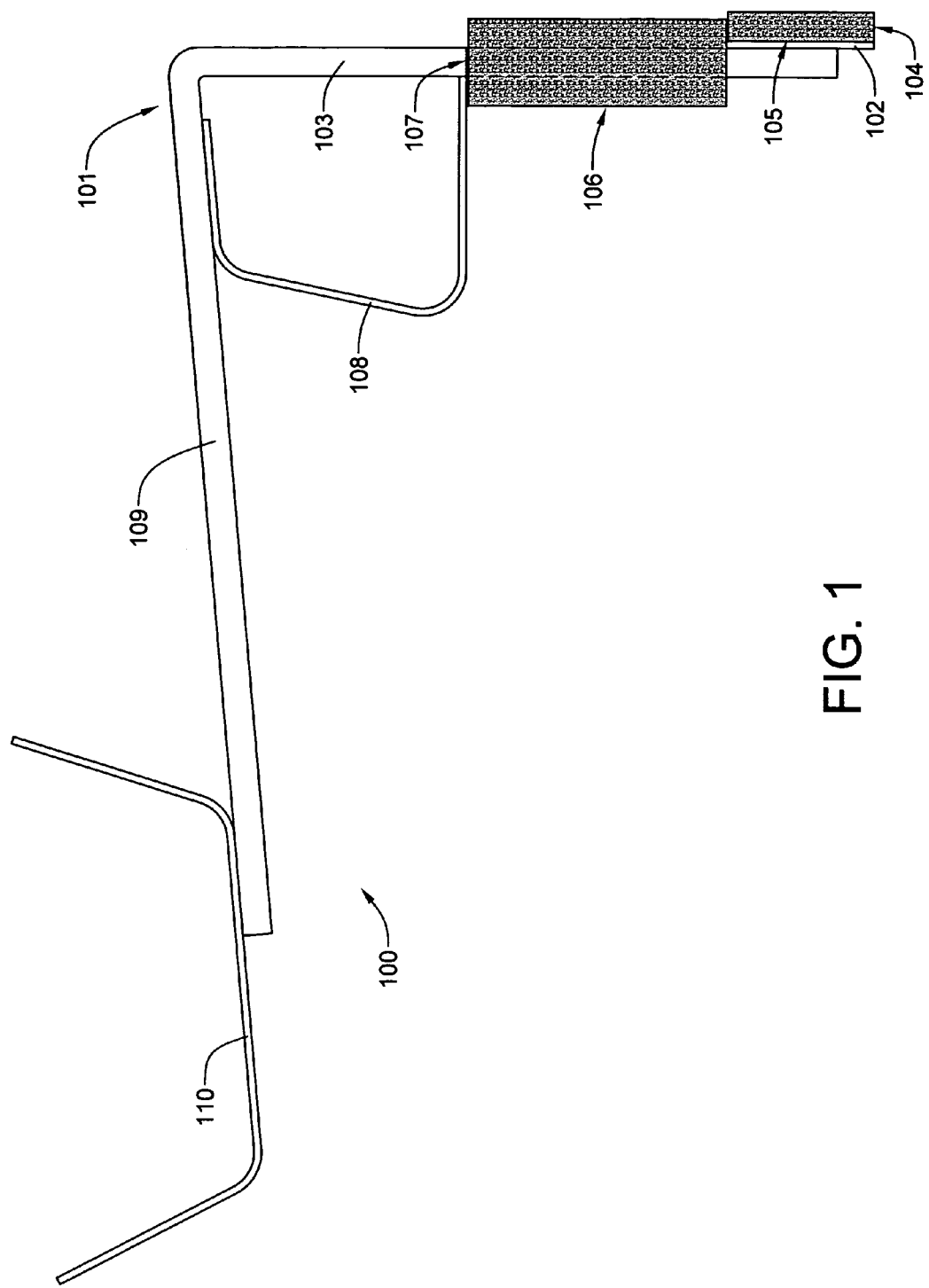
FIG. 1 is a left-side elevational view of a ladder retention bracket.
Figure 3:
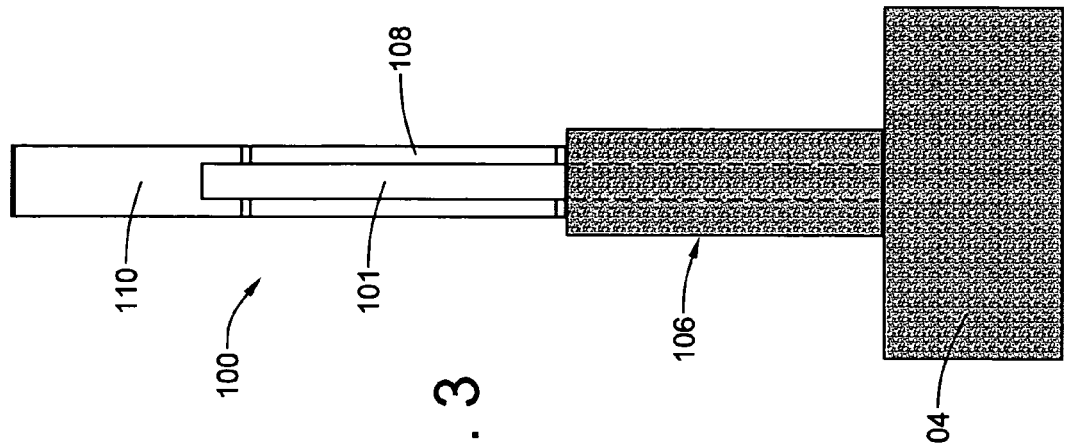
FIG. 3 is a rear elevational view of the ladder retention bracket of FIG. 1.
Figure 2:
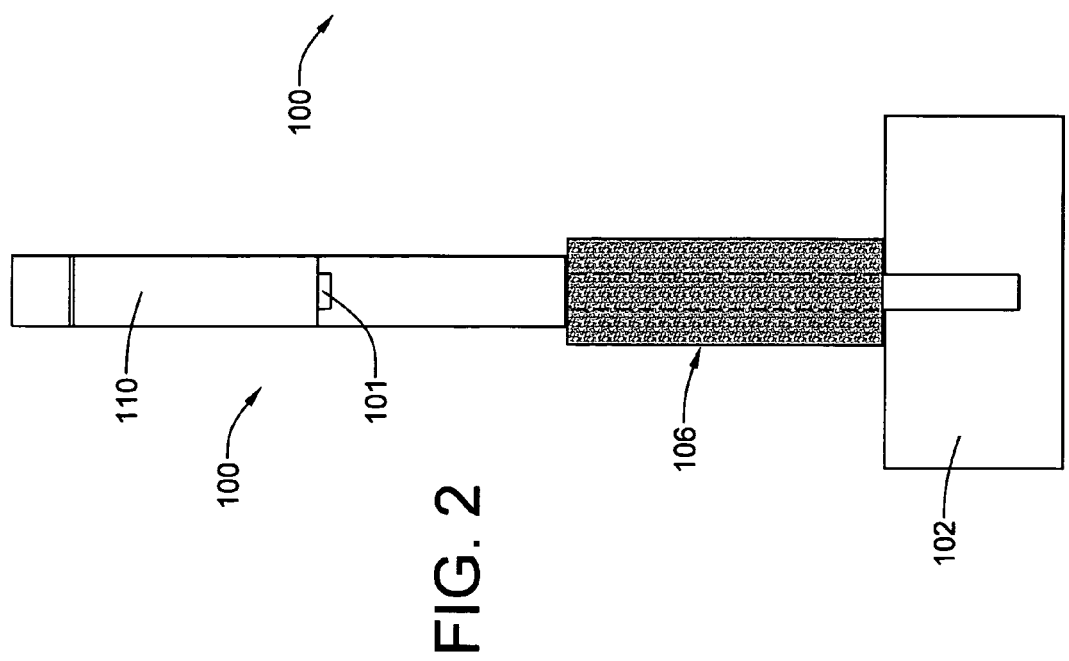
FIG. 2 is a front elevational view of the ladder retention bracket of FIG. 1.

Referring now to FIGS. 1, 2 and 3, the ladder retention bracket 100 has a generally L-shaped frame 101, a stop plate 102 welded to the short portion 103 of the L-shaped frame 101, a resilient pad 104 adhesively bonded to a rearward-facing surface 105 of the stop plate 102. The resilient pad 104 is made of a material, such as a soft elastomeric compound, foam rubber, felt, or any similar material that is both durable and will prevent scratching of automotive paint. Directly above the stop plate, a cylindrical foam pad 106 surrounds an intermediate part 107 of the short portion 103. For a preferred embodiment of the invention, a rear ladder indexing arm 108 is welded to both the short portion 103 and the long portion 109 of the L-shaped frame 101. A front ladder indexing arm 110 is welded to a front part the long portion 109 of the L-shaped frame 101. Except for the padding thereon, the ladder retention bracket 100 is preferably fabricated from a structural metal such as mild steel, chrome-molybdenum alloy steel, stainless steel or aluminum.

Referring now to FIG. 4, a conventional extension ladder 400 is shown. The extension ladder 100 has a base (lower) section 401, a fly (upper) section 402 which slides within the base section 401, and an extension lock 403, which is barely visible in this view. The base section 401 comprises a left base rail 404L, a right base rail 404R, and twelve base rungs 405. The opposite ends of each base rung 405 is rigidly attached to the opposed base rails 404L and 404R, of which only the left base rail 404L is visible in this view. The fly section 402 comprises a left fly rail 406L, a right fly rail 406R, and twelve fly rungs 407. The opposite ends of each fly rung 407 is rigidly attached to the opposed fly rails 406L and 406R, of which only the left fly rail 406L is visible in this view.

Referring now to the cross-sectional view FIG. 5, only the right base rail 404R, the right fly rail 406R and a major portion of each rung 405 and 407 are visible in this view. When the ladder retention bracket 100 is installed in the extension ladder 400, and the latter is positioned on the bed and cab of a pickup truck, the rear ladder indexing arm 108 bears against a lower rung of the fly (upper) section of the extension ladder and prevents rearward motion thereof. Also for a preferred embodiment of the invention, a front ladder indexing arm 110 is welded to a front portion of the long portion 109 of the L-shaped frame 101. The ladder retention bracket 100 is balanced so that as the rear ladder indexing arm 108 bears against a lower rung of the fly section when it is installed in an extension ladder, the front ladder indexing arm 110 bears against a lower rung of the base (lower section) of the extension ladder. It will be noted that the extension lock 403 is more clearly visible in this view.

Referring now to FIG. 6, a front support pad 600 includes a ladder-width resilient pad 601 and an adjustable strap 602, which is inserted through a pair of slits 603A and 603B in the resilient pad 601. The adjustable strap 602 has a female buckle 604 and a male buckle 605. The front support pad 600 is strappable to the extension ladder 400 where it will rest on the rear edge of the pickup truck cab. The adjustable strap 602 encircles both the base section 401 and the fly section 402 of the extension ladder 400.

Referring now to FIG. 7, one of a pair of identical rear support pads 700 is shown. Each rear support pad 700 includes a rail-width resilient pad 701 and an adjustable strap 702, which is inserted through a pair of slits 703A and 703B in the rail-width resilient pad 701. The adjustable strap 702 is of sufficient length to encircle either both left or both right base and fly rails (404L/406L or 404R/406R) of the extension ladder 400. Each rear support pad 700 is positioned on the extension ladder 400 so that it will provide a cushion between the ladder and the upper edge of the pickup tailgate.

Figure 8:
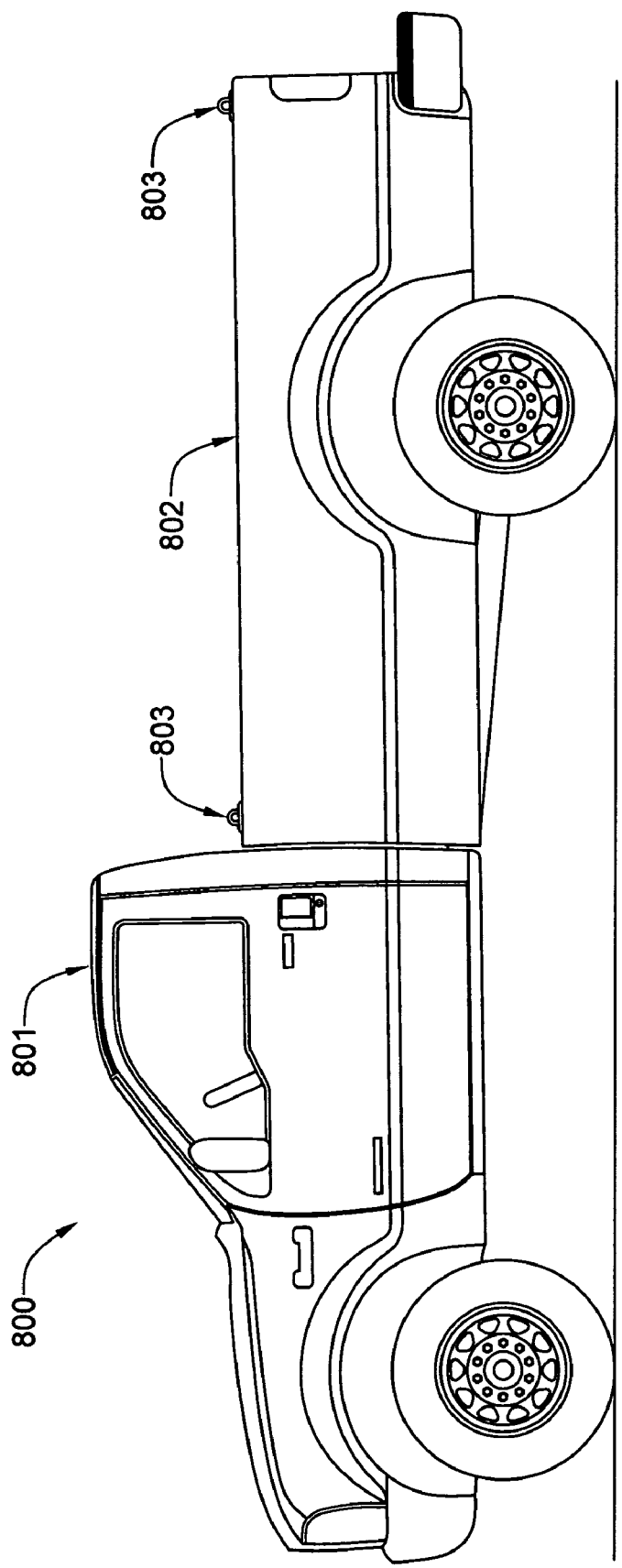
FIG. 8 is a side elevational view of a standard cab pickup truck having tie-down anchors installed at each of the four corners of the pickup bed.

Referring now to FIG. 8, a pickup truck 800 has a cab 801 and a bed 802. It will be noted that conventional tie-down anchors 803 have been installed at the four corners of the bed 801. Because this is an isometric view of the pickup truck 800, only the tie down anchors on the left side of the vehicle are visible.

Figure 9:
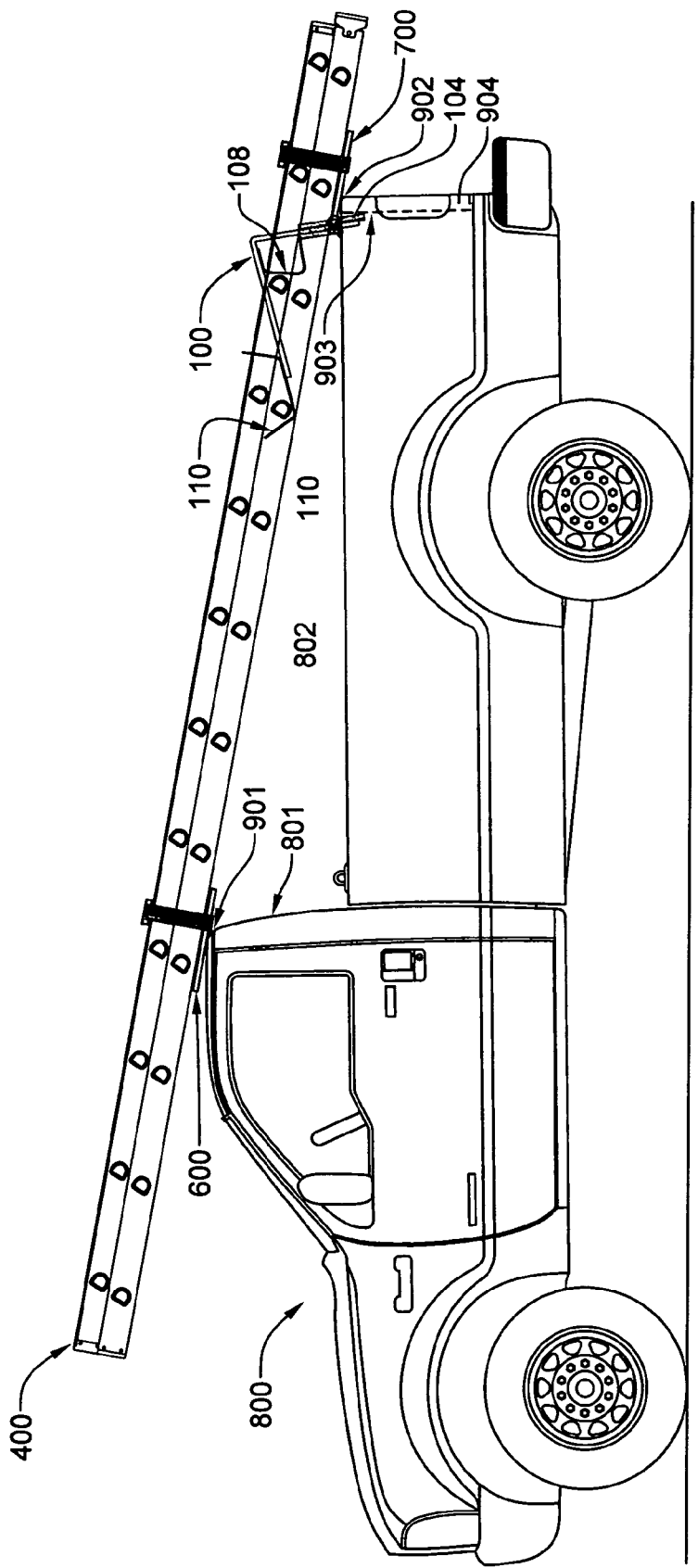
FIG. 9 is a side elevational view of the pickup truck of FIG. 8, an extension ladder to which have been strapped a front support pad and two rear support pads, a ladder retention bracket installed on the extension ladder, with the ladder being positioned so that it is supported on a rear edge of the cab and on an upper edge of the tailgate and the stop plate of the ladder retention bracket biased against the generally vertical inner surface of the tailgate.

Referring now to FIG. 9, a front support pad 600 and a pair of rear support pads 700 have been strapped to the extension ladder 400, the ladder retention bracket 100 has been installed on the extension ladder 400 and the entire assembly has been positioned on the pickup truck 800 such that the front support pad 600, which is strapped to the extension ladder 400 with adjustable strap 602, is resting on the upper rear edge 901 and the two rear support pads 700, each of which is strapped to the extension ladder 400 with adjustable strap 702, are resting on the upper edge 902 of the tailgate of the pickup truck 800. Preferably, the extension ladder 400 is laterally centered on the bed 802 and cab 801. It will be noted that the entire ladder retention bracket 100 is visible in this view, as though the ladder and truck were made of a transparent material. This is just an illustrative view so that it can be appreciated how the resilient pad 104, that is adhesively bonded to the rearward-facing surface 105 of the stop plate 102 of the ladder retention bracket 100, is biased against the forward vertical surface 903 of the tailgate 904. As the rear ladder indexing bracket 108 and the front ladder indexing bracket 110 also provide forward biasing of the ladder retention bracket 100 against at least one rung of the extension ladder 400, it should be clear that the ladder retention bracket 100 prevents the ladder 400 from moving rearward, even though it is inclined.

Figure 10:
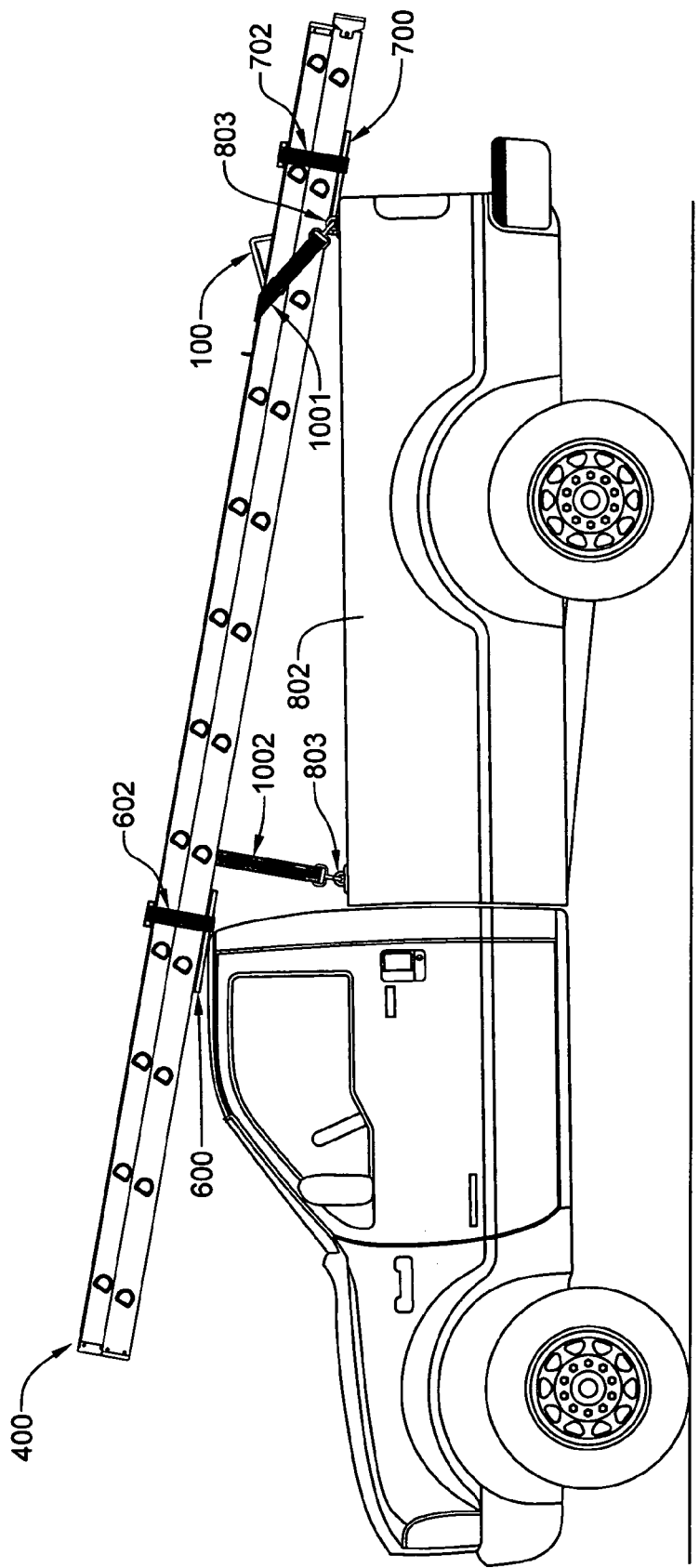
FIG. 10 is a side elevational view of the pickup truck, ladder, pad and retention bracket assembly of FIG. 9, to which has been added a plurality of straps which secure a forward portion of the extension ladder to the forward tie-down anchors and a rear portion of the extension ladder to the rear tie-down anchors.

Referring now to FIG. 10, the extension ladder 400 has been secured to to the tie-down anchors 803 at the four corners of the bed 802 with ropes or with straps (as shown). As the rear straps 1001 are angled forward, they hold the ladder retention bracket 100 against the tailgate 904 and prevent the ladder 400 from moving forward. The fact that the ladder is inclined also aids in preventing forward movement. The front straps 1002 need not be angled forward or rearward, as they are required to maintain only lateral positioning of the ladder 400 on the pickup truck 800. The '972 patent to Kocina illustrates the art of tying a ladder to four corners of a vehicle. Tie-down anchors are certainly not required and the apparatus of the present invention need not include tie-down anchors 803, as the extension ladder 400 may be secured to opposite ends of the rear bumper and underside of the pickup truck 800 as well. The tie-down anchors 803 merely make securing the extension ladder 400 to the pickup truck 800 more convenient.

Although only a single embodiment of the present invention has been disclosed herein, it will be obvious to those having ordinary skill in the art that changes and modifications may be made thereto without departing from the scope and spirit of the invention as hereinafter claimed.

What is claimed is:

1. An apparatus for securing and carrying a ladder having channel shaped rail members and tubular connecting rungs secured within openings in the web of each of said rails on a pickup truck having a cab and a tailgate that is pivotable between a generally horizontal open position and a generally vertical closed position, said ladder being secured and carried in a longitudinal orientation and supported by an upper rear edge of the cab and an upper edge of the tailgate, said apparatus comprising:
   a ladder retention bracket that is not rigidly secured to the truck, said ladder retention bracket having a generally L-shaped frame to which is attached a padded stop plate and at least one ladder indexing arm, a rear-facing surface of a ladder rung pressing against said at least one ladder indexing arm, and said stop plate pressing against a forward-facing surface of the raised tailgate in response to a tendency of a carried ladder to slide rearward under the influence of vibration and gravity, said ladder retention bracket thereby counteracting the force of gravity acting on a carried ladder;
   a first pad set secured to lower edges of a forward portion of the ladder's rail members, said first pad set preventing direct contact between the ladder and the upper rear edge of the cab;
   a second pad set secured to lower edges of a rear portion of the ladder's rail members, said second pad set preventing direct contact between the ladder and the upper edge of the tailgate; and
   a plurality of binding members for securing the ladder to at least a pair of forward anchoring points and to a pair of rearward anchoring points, forward and rearward anchoring points being located on opposite sides of the pickup truck.

2. The apparatus for securing and carrying of claim 1, wherein said L-shaped frame, said stop plate and said at least one ladder indexing arm are fabricated from a structural metal selected from the group consisting of mild steel, stainless steel, aluminum, magnesium, and alloys thereof.

3. The apparatus for securing and carrying of claim 1, wherein said first and second pad sets comprise resilient foam rubber.

4. The apparatus for securing and carrying of claim 1, wherein said plurality of binding members are ropes.

5. The apparatus for securing and carrying of claim 1, wherein said plurality of binding members are straps.

6. The apparatus for securing and carrying of claim 1, wherein said ladder retention bracket wraps over and under an adjacent pair of ladder rungs.

7. The apparatus for securing and carrying of claim 5, wherein each strap includes at least one ratcheting tensioner.

8. An apparatus for securing and carrying an extension ladder having multiple rungs on both a base and a fly on a pickup truck having a cab and a cargo bed having a tailgate, the ladder being longitudinally positioned on the truck in an inclined configuration, and supported by a rear edge of the cab and an upper edge of the tailgate, said apparatus comprising:
   a plurality of pads securable to the ladder, which prevent direct contact of the ladder with the cab and tailgate;
   a ladder retention bracket, not in contact with a floor of the cargo bed, and not rigidly secured to the truck, said ladder retention bracket being securable to at least one rung and pressing against an inner vertical surface of the tailgate in response to a tendency of a carried ladder to slide rearward under the influence of vibration and gravity, said ladder retention bracket thereby counteracting the force of gravity acting on the carried ladder and preventing the extension ladder from sliding rearward on the pickup truck; and
   a plurality of binding members for securing the ladder to at least a pair of forward anchoring points and to a pair of rearward anchoring points, forward and rearward anchoring points being located on opposite sides of the pickup truck.

9. The apparatus for securing and carrying of claim 8, wherein said ladder retention bracket has a generally L-shaped frame to which is attached a padded stop plate and at least one ladder indexing arm, said at least one ladder indexing arm being biasable against a rear-facing surface of a ladder rung, said stop plate being biasable against a forward-facing surface of the raised tailgate.

10. The apparatus of claim 9, wherein said L-shaped frame, said stop plate and said at least one ladder indexing arm are fabricated from a structural metal selected from the group consisting of mild steel, stainless steel, aluminum, magnesium, and alloys thereof.

11. The apparatus for securing and carrying of claim 8, wherein said pads are made of resilient polymeric foam material.

12. The apparatus for securing and carrying of claim 8, wherein said plurality of binding members are selected from the group consisting of ropes and straps.

13. The apparatus for securing and carrying of claim 12, wherein each strap binding member includes at least one ratcheting tensioner.

14. The apparatus for securing and carrying of claim 8, wherein said ladder retention bracket wraps over and under an adjacent pair of ladder rungs, one of which is associated with the base, the other being associated with the fly.

15. An apparatus for securing and carrying an extension ladder having multiple rungs on both a base and a fly on a motor vehicle having a cab and a cargo bed having a tailgate, the ladder being longitudinally positioned on the motor vehicle and supported by a rear edge of the cab and an upper edge of the tailgate that is at a lower level than said rear edge, said apparatus comprising:
   a plurality of pads securable to the ladder, which prevent direct contact of the ladder with the cab and tailgate;
   a ladder retention bracket, not in contact with a floor of the cargo bed, and not rigidly secured to the truck, at least one rung of said extension ladder pressing rearwardly against said ladder retention bracket, and said ladder retention bracket pressing rearwardly against an inner vertical surface of the tailgate, in response to a tendency of the carried extension ladder to slide rearward under the influence of vibration and gravity, said ladder retention bracket thereby counteracting the force of gravity acting on the carried extension ladder, thereby preventing the extension ladder from sliding rearward on the pickup truck; and
   a plurality of binding members for securing the ladder to at least a pair of forward anchoring points and to a pair of rearward anchoring points, forward and rearward anchoring points being located on opposite sides of the pickup truck.

16. The apparatus for securing and carrying of claim 15, wherein said ladder retention bracket has a generally L-shaped frame to which is attached a padded stop plate and at least one ladder indexing arm, said at least one ladder indexing arm being biasable against a rear-facing surface of a ladder rung, said stop plate being biasable against a forward-facing surface of the raised tailgate.

17. The apparatus of claim 16, wherein said L-shaped frame, said stop plate and said at least one ladder indexing arm are fabricated from a structural metal selected from the group consisting of mild steel, stainless steel, aluminum, magnesium, and alloys thereof.

18. The apparatus for securing and carrying of claim 15, wherein said pads are made of resilient polymeric foam material.

19. The apparatus for securing and carrying of claim 15, wherein said plurality of binding members are selected from the group consisting of ropes and straps.

20. The apparatus for securing and carrying of claim 15, wherein said ladder retention bracket wraps over and under an adjacent pair of ladder rungs, one of which is associated with the base, the other being associated with the fly.

* * * * *